July 9, 1968 R. W. ASTHEIMER 3,392,282
AUTOMATIC METHOD OF COMPENSATING RADIOMETERS
FOR EMISSIVITY OF THE OPTICS
Filed Dec. 10, 1964

INVENTOR
ROBERT W. ASTHEIMER
BY
*Robert Ames Norton*
ATTORNEY

United States Patent Office 3,392,282
Patented July 9, 1968

3,392,282
AUTOMATIC METHOD OF COMPENSATING RADIOMETERS FOR EMISSIVITY OF THE OPTICS
Robert W. Astheimer, Westport, Conn., assignor to Barnes Engineering Company, Stamford, Conn., a corporation of Delaware
Filed Dec. 10, 1964, Ser. No. 417,330
4 Claims. (Cl. 250—83.3)

ABSTRACT OF THE DISCLOSURE

A radiometer with a reference black body cavity, optics, and conventional differential electronic circuits receiving detector output signal is provided in one modification with a chopper external to the black body cavity provided with alternate mirrored and open segments, the mirrored segments being provided with narrow blackened strips, the extent of which in passing through the image of the entrance pupil is equal to the emissivity of the optics whereby a signal in opposite phase is produced which is equal to the radiation from the optics passing through open segments in the chopper.

In another modification the chopper is situated within the black body cavity and also a mask with alternate blackened opaque segments and open segments. The opaque segments are provided with small openings and an adjustable mask is mounted in front of the cavity to cover partially the openings, the amount by which the openings are obscured being equal to the entrance aperture divided by optics emissivity.

In both modifications the out-of-phase signal produced corresponding to the optics emissivity introduces a term in the total signal equation which cancels out regardless of temperature of the optics.

Background of the invention

Radiometers and particularly infrared radiometers which have been used for measuring the temperature of objects by the infrared radiations therefrom have found extenssive use both for military and commercial purposes. A typical infrared radiometer for temperature measurements is described in the patent to Weiss No. 3,039,006, June 12, 1962. This radiometer, which is suitable for airborne use, has achieved marked commercial success for measurement of temperatures of surfaces such as, for example, the surface of the sea.

Essentially radiometers for measurement of the temperature of surfaces include an infrared detector, collecting optics to image the target, the temperature of which is to be measured, onto the plane of the detector, and chopping means which alternately pass radiation from the target to the detector and then reflect radiation from a suitable reference source, ordinarily in the form of a black body cavity and maintained at a predetermined temperature. A.C. electronic processing and amplifying circuits are also included, and receive a signal output from the infrared detector.

It will be noted that the output of the radiation detector compares radiation from the target with radiation from the reference temperature source. These two radiations are in opposite phase so that the electronic circuits can produce a final output which is the difference between radiation intensity of the two sources.

One of the problems presented by radiometers which measure temperature is the fact that the instrument is not maintained at a uniform temperature, with the exception of the reference temperature source or black body cavity. As a result, certain elements of the radiometer, notably the optics, such as a collecting lens, also radiate in the infrared and since the temperature of the optics changes, the error introduced cannot be eliminated by any initial calibration. It is true that most optics have relatively low emissivities in the infrared and, therefore, the varying amounts of spurious radiation resulting from changes in temperature of the optics is not numerically a large quantity. However, with precision instruments, and especially instruments where the temperature of the optics may vary over wide ranges, the error introduced is a significant one.

Of course, it is theoretically possible to maintain the temperature of the whole of the radiometer including its optics at a definite temperature but this requires elaborate thermostating, consumption of power and other disadvantages so that for many purposes the radiometer has not been completely corrected for emissivity of the optics and a corresponding decrease in precision of the response has been accepted as the lesser of the two evils when compared to the increased cost, complexity and power requirements which a completely thermostated radiometer would require. Also it is extremely difficult to thermostat the aperture optic since it must be exposed to radiation and cannot be insulated. It is with an automatic and practically perfect compensation for emission of radiations from the optics that the present invention deals.

It has been stated above that the normal radiometer involves elements and circuits which compare two out-of-phase signals.

Summary of the invention

The present invention produces compensation by introducing a signal out of phase with the signals from the target and exactly equal to the signal produced by the radiation from the optics regardless of variations in temperature of the optics. The out-of-phase signal is produced by radiation at the same temperature as the spurious radiation and, therefore, the compensation holds regardless of changing temperatures and regardless of the fact that radiation from a body at a particular temperature varies as a higher power of the absolute temperature. In the case of total radiation from a black or a gray body this is the fourth power. It should be noted that the present invention does not require any new or modified electronic processing circuits. However, the conventional processing circuits which compare out-of-phase signals are needed in the present invention although their design is not thereby changed.

Description of the preferred embodiments

Figure 1:
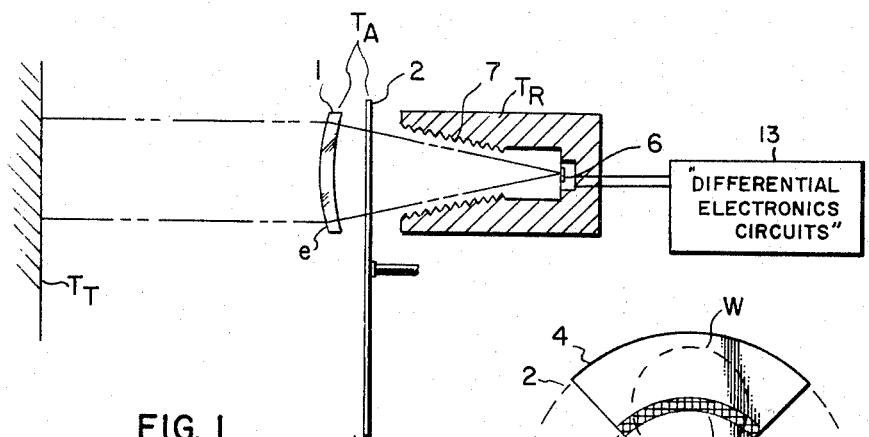
FIG. 1 is a section through one type of radiometer.
Figure 2:
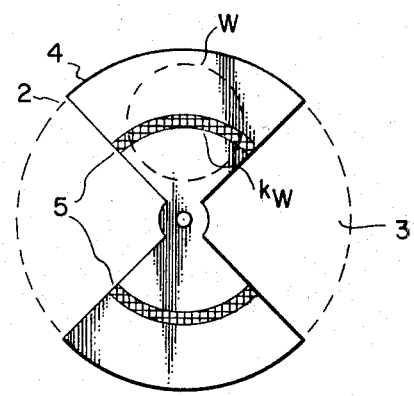
FIG. 2 is a vertical elevation of the chopper in FIG. 1.

FIG. 1 illustrates, in diagrammatic form, a radiometer in which the chopping mechanism is at ambient temperature. Incoming radiation from a target at temperature $T_T$ is collected by an objective lens 1 chopped by a conventional chopper 2 which is composed of open and reflecting segments 3 and 4 as shown in FIG. 2. The target is imaged onto the plane of a detector 6 which is located in a thermostated reference black body cavity 7 maintained at a reference temperature $T_R$. Signals from the detector are amplified in conventional differential circuits 13. The lens and chopper are at an ambient temperature $T_A$ and the lens possesses an emissivity $e$, which, though small, is by no means zero. The entrance aperture of the optics is shown in dashed lines on FIG. 2 which represents the chopper in its closed position. The area of the entrance aperture or entrance pupil of the system will be assumed to be equal to W. According to the present invention a small area in the form of a blackened strip is provided on each mirror blade 4 of the chopper. The portion of this area in the projection of the entrance pupil is equal to $kW$. The signal received by the detector in the form of radiation when the chopper is open is made up of two components. The following equation represents the signal S:

$$S=[T_T(1-e)W+T_A eW]-[T_R \cdot (1-k)W+T_A kW]$$

The first term is a function of $T_T$ multiplied by $(1-e)W$ and the second term is a function of $T_A$ multiplied by $eW$. When the chopper is closed the radiation on the detector is a function of $T_R$ multiplied by $(1-k)W$ and a second term a function of $T_A$ multiplied by $kW$ for, of course, the chopper is at the same ambient temperature as the lens 1. Since the conventional electronic circuits compare the two out-of-phase signals the final signal may be wrong. According to the invention $k$ is made equal to $e$. Now the second term in the equation becomes zero and the final output is represented by the following equation:

$$S=(T_T-T_R)(1-e)W$$

It will be seen that the effect of the blackened strip is to introduce a signal exactly equal to the radiation from the optics but in reverse phase. This results in cancelling out the effect regardless of the ambient temperature. It requires only an initial knowledge of the emissivity of the lens 1 which is either known or can be determined by experiment. The width of the blackened strip then follows and a radiometer is produced in which the effect of radiation from the optics is completely cancelled at all ambient temperatures. It should be noted that the emissivities in the equations set out above may be and often are quite different for the target than for the optics. The present invention cancels out errors due to radiation from the optics. It does not eliminate the problem of target emissivity.

Figure 3:
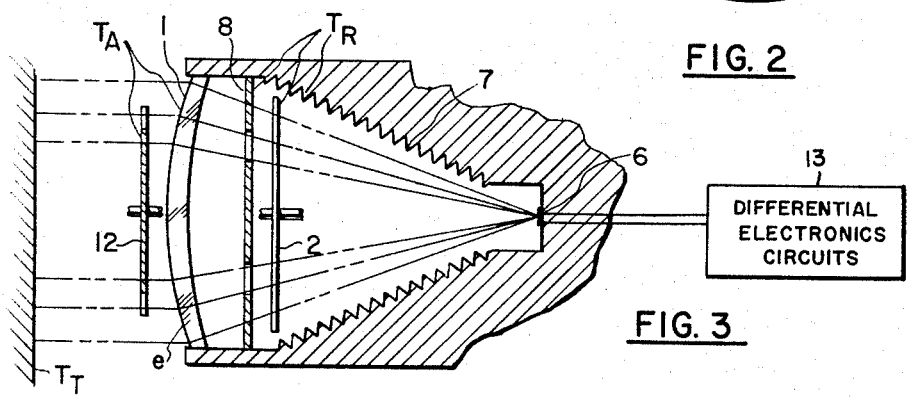
FIG. 3 is a section through a modified radiometer.
Figure 4:
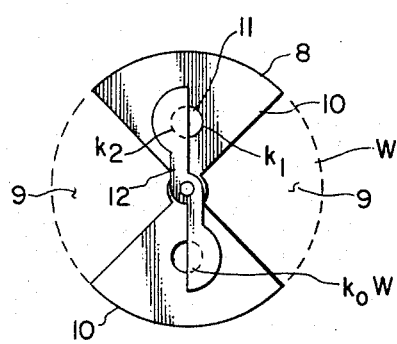
FIG. 4 is a vertical elevation of the mask used in FIG. 3.

FIGS. 3 and 4 represent the same compensation for a somewhat different type of radiometer utilizing a chopper and mask. In these figures also the detector is connected to differential electronic circuits 13 as in FIG. 1. These elements are in the reference cavity and so at reference cavity temperature. The chopper 2 is of the same design as in FIG. 2 and, therefore, given the same numeral except that it does not have any black strip on its reflecting blades. The mask is designated 8 and is shown in FIG. 4. It is composed of open segments 9 and opaque segments 10. The opaque segments, however, are provided with small equal openings 11, the area of which is equal to $k_0W$ where W is the area of the open segment 9. In front of the lens there is then located a double vane 12 which can be moved to partially close the openings 11 leaving the portion $k_1$ open and the portion $k_2$ closed. The equations now are of the form shown as follows:

Chopper open $$S=T_T(1-e)W+T_A eW+T_R W$$

Chopper closed $$S=T_R(1-k_1-k_2)W+T_T k_1 W+T_A k_2 W+T_R W$$

Net $S=(1-e-k_1)T_T W$
$\qquad -(1-k_1-k_2)T_R W-(k_2-e)T_A W$

Since the function of the temperature does not change, for simplicity the equations leave it out. Now when $k_2$ is made equal to $e$ the error due to the radiation from the lens falls out and the final signal is represented by the equation as follows:

$$S=(1-k_0)(T_T-T_R)W$$

Again it will be seen that the spurious signal due to radiation from the lens is cancelled out and, therefore, does not result in any inaccuracy regardless of changing ambient temperatures in which the lens finds itself.

It will be noted that in the two typical examples of radiometers described above in conjunction with the drawings, in each case there has been produced a quantity equal to the radiation from the optics but in opposite phase.

I claim:

1. In a radiometer having a radiation detector, optical means including refractive optics, a reference radiation source, chopping means for alternately passing radiation through the entrance pupil of the optical means and radiation from the reference source, and phase sensitive differential, electronic processing circuits the input of which is connected to the output of the radiation detector to produce an output signal which is the difference between the two radiation signals which are out of phase, the improvement which comprises, means for producing radiation for the wavelength corresponding to the temperature of the optical means striking the detector in phase with the radiation from the reference radiation source and constituting a restricted beam having only a portion of the cross-section of the beam from the entrance pupil of the optical means, said proportion being equal to the emissivity of the optical means.

2. A radiometer according to claim 1 for measurement of radiation in the infrared in which the radiation detector is an infrared radiation detector.

3. A radiometer according to claim 2 in which the chopping means is exposed to the same ambient temperature as the optical means and is formed of alternating open and mirror segments, said chopping means being located between the optical means and the detector and positioned alternately to reflect the radiation from the reference source and to permit radiation from the entrance pupil of the optical system to strike the detector, the reflecting blades of the chopper being provided with blackened strips the area of which when crossing the beam from the entrance pupil is equal to the emissivity of the optical means.

4. A radiometer according to claim 2 in which the chopping means is composed of alternate open segments and blade closing segments associated with a mask, both masks being located in a black body cavity which constitutes the reference source and being maintained at reference source temperature, the mask having two open and two blackened quadrants of equal size, each blackened quadrant having a small opening of the same size in each quadrant and means for obscuring the two openings uniformly, the obscured portion of the opening being equal to the entrance aperture divided by optical means emissivity.

References Cited

UNITED STATES PATENTS

| 3,097,300 | 2/1963 | Wormser et al. | 250—83.3 |
| 3,141,095 | 7/1964 | Klose | 250—83.3 |

ARCHIE R. BORCHELT, *Primary Examiner.*